Sept. 29, 1931.  M. HIGGINS  1,825,523
DISTRIBUTOR FOR MANURE AND OTHER MATERIAL
Filed May 16, 1929  2 Sheets-Sheet 1
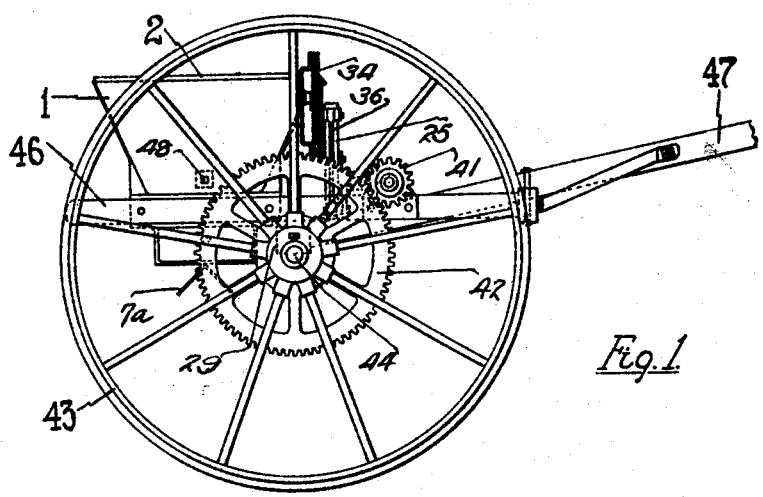
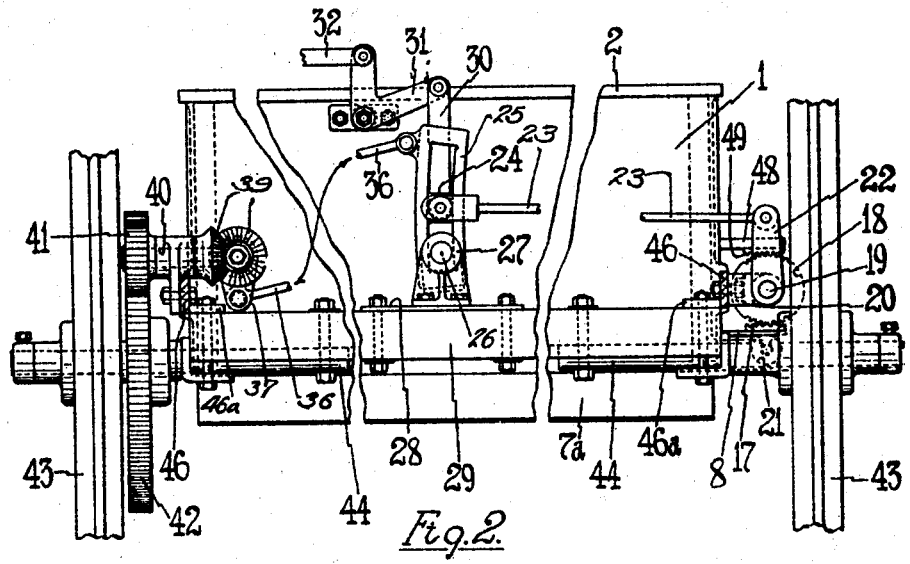
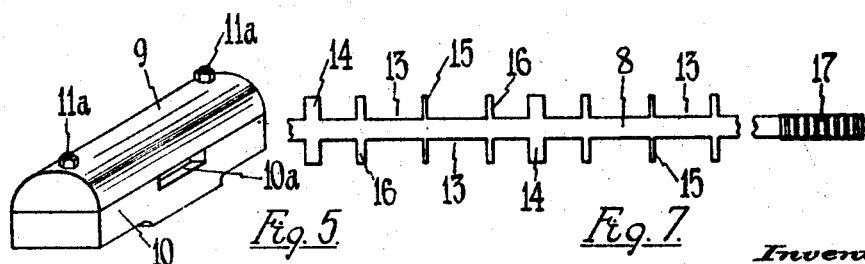
Inventor:
M. Higgins,

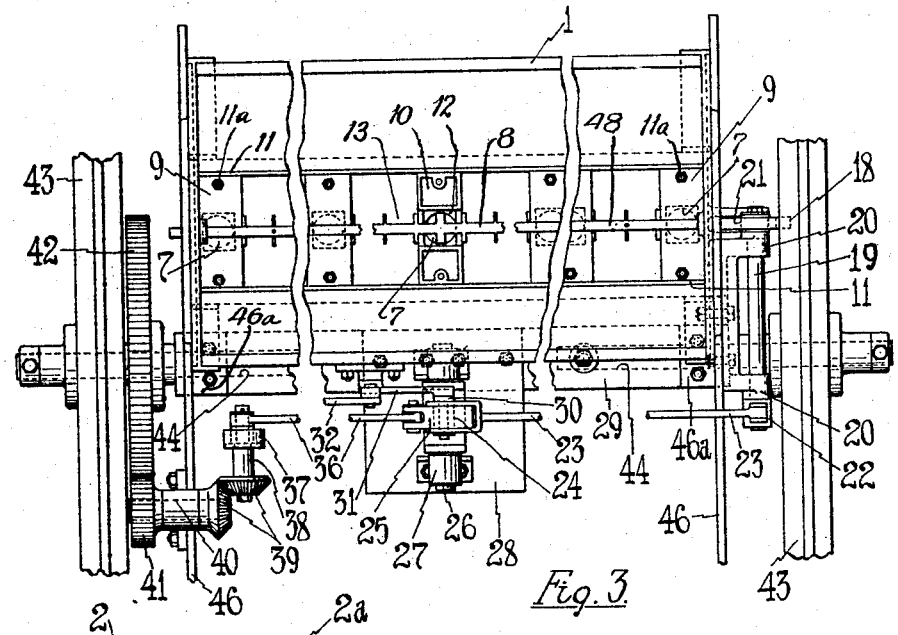

Patented Sept. 29, 1931

1,825,523

UNITED STATES PATENT OFFICE

MICHAEL HIGGINS, OF MERCER, AUCKLAND, NEW ZEALAND

DISTRIBUTOR FOR MANURE AND OTHER MATERIAL

Application filed May 16, 1929, Serial No. 363,657, and in New Zealand June 2, 1928.

This invention relates to apparatus for distributing manure and other material over areas of land, and has for its object, an improved form of distributor of the type comprising a hopper for the material to be distributed mounted on running wheels, and containing in its bottom openings over or in which means actuated from the running wheels are operated to effect the discharge of the contents of the hopper through the openings aforesaid.

The improved machine is designed with a view of obtaining an even distribution of the material with the aid of few mechanically operated parts not likely to easily get out of order, and also to provide for easy access to the parts effecting the distribution for cleaning and inspection purposes, and further so that the control of the delivery or discharge of the material will be under immediate control of the operator, and regulatable by the latter at will.

According to the invention the improved distributor comprises a hopper having in its bottom material discharge openings over which is reciprocated a feeder plate, containing recesses in its vertical edges.

The feeder plate works through fittings secured over the openings in the hopper bottom, said fittings being constructed so that they scrape the feeder plate and keep it clean.

In order to provide for variation in the stroke of the feeder plate so as to enable the discharge of the material to be controlled, a shifting link motion is incorporated in the mechanism through which said feeder plate receives its reciprocation.

The bottom of the hopper is hinged to open downwards to give ready access to the discharge openings, the fittings through which the feeder plate is reciprocated, and also the latter, for inspection and cleaning.

The above and other features comprised in the invention are illustrated in the accompanying drawings, and will be further described in conjunction therewith, Figure 1 being a side elevation of the improved machine, and Figures 2 and 3 a front elevation and plan view, respectively, (both broken) of same, while, Figure 4 is a cross sectional elevation of the hopper, Figure 5 a perspective view of one of the fittings through which the feeder plate is reciprocated Figure 6 a cross sectional view of the fitting illustrated in Figure 5

Figure 7 a plan view of portion of the feeder plate, and

Figure 8 a detail view of the hand lever for adjusting the rocker link of the link motion.

The hopper 1 which has a cross sectional shape as shown in Figure 4, is provided with a lid 2 hinged at $2^a$ to open upwards, and a bottom 3 hinged at $3^a$ to open downwards said bottom being retained in its closed position by bolts 4 pivoted at $4^a$ to the hopper 1 and adapted to be entered in the slotted ends of straps 5 attached to the bottom 3 so that the wing nuts 6 on the bolts 4 pass below said straps.

Material discharge openings 7 in the hopper bottom 3 are equally spaced along the bottom thereof, while below said openings 7 a ridge shaped spreader $7^a$ is attached to said bottom 3 for distributing the material falling through said openings 7.

The fittings secured over the material discharge openings 7 and through which the feeder plate 8 is reciprocated comprise upper and lower castings 9 and 10 respectively (Figures 4, 5 and 6) bolted together crossways of the hopper 1 and to longitudinal angle irons 11 in the latter by bolts $11^a$.

These castings 9 and 10 are both made hollow while the lower casting 10 contains an opening 12 which is made to register with the material discharge opening 7 over which it is fitted, and also has in its upper side edges recesses $10^a$, the latter when the upper casting 9 is secured in position on the lower casting 10 providing openings in the sides of the fitting through which the feeder plate 8 is reciprocated, the lower side edges of the upper casting 9 and the edges of the recesses $10^a$ serving as scrapers to the feeder plate 8.

The feeder plate 8 contains in its longitudinal vertical edges or sides recesses 13 provided for the purpose of allowing material contained in the hopper 1 to be worked, by the reciprocation of the plate 8 through the openings in the sides of the fittings placed across the material discharge openings 7, into said fittings and thence down through the openings 12 and 7, said recesses 13 being formed so that at distances apart on the plate 8, equal to the distances at which the openings 7 in the hopper bottom 3 are spaced apart, there are left at each side of the plate 8 comparatively wide fingers 14, while midway between the latter comparatively thin fingers 15 are provided with further fingers 16 wider than the fingers 15 and of less width than the fingers 14 between the latter and the fingers 15.

The feeder plate 8 also operates through the ends of the hopper and at one end is provided with a toothed rack 17 with which meshes a pinion 18 keyed on a shaft 19 mounted in bearings 20 across the end of the hopper 1, a roller bearing 21 being provided under the end of the plate 8 to keep the rack 17 up to the pinion 18.

Also keyed on the shaft 19 is an arm 22 to the outer end of which is connected a rod 23 the other end of the latter being pivoted to a link block 24 in the radial link 25 mounted on the rocker shaft 26 the latter being supported by bearings 27 on the platform 28 on the beam 29.

The link block 24 is suspended by a rod 30 from one leg of a bell crank lever 31 the other leg of which is connected by a rod 32 with a leg 33ª (Figure 8) of a further bell crank or hand lever 33 working in conjunction with a rack 34 and having a spring actuated locking pawl 35 for retaining said lever 33 in a selected position.

The upper end of the radial link 25 is connected by a rod 36 with a crank arm 37 keyed on a shaft 38 driven through bevel gearing 39, a shaft 40, pinion 41, and a spur wheel 42 the latter being rotated with a running wheel 43.

The running wheels 43 are mounted on stub axles 44 secured to the cross beam 29 which is bolted to brackets 46ª on metal bars 46 fastened to the end plates of the hopper 1. Shafts 47 attached to said cross beam 29 are suitably stayed from said bars 46.

If desired the shafts 47 and running wheels 43 can be dispensed with and the hopper 1 supported by poles projecting from the rear of a dray or other vehicle, in which case the spur wheel 42 will be driven through a suitable chain drive from a running wheel of the dray or other vehicle.

In use with the wheels 43 running along the ground or the spur wheel 42 driven through the drive just mentioned, the shaft 38 and arm 37 are rotated and reciprocate the rod 36, link 25 and rod 23, the latter rocking the arm 22 and shaft 19 to oscillate the pinion 18 which in turn reciprocates the feeder plate 8 through the fittings secured across the material discharge openings 7 in the hopper bottom 3, and also through the hopper ends for the purpose of agitating and working the material to be discharged into the said fittings and down through the openings 7 as aforesaid.

The stroke of the feeder plate 8 and consequently the quantity of material discharged through the openings 7 at each stroke of said plate, can be varied by adjusting the lever 33 to raise or lower the link block 24 in the radial link 25 whereby the stroke of the connecting rod 23 and the oscillation of the arm 22, shaft 19 and pinion 18 are varied without altering the stroke of the rod 36.

In order to obtain further agitation of the material within the hopper 1 there is provided a further longitudinal bar 48 provided with pins 48a and operable through the hopper ends said bar 48 being fitted with an inverted rack 49 meshing with the top of the pinion 18 so that oscillation of the latter, reciprocates the bar 48 as well as the feeder plate 8.

As an alternative to the single feeder plate 8 operating longitudinally of the hopper 1 there may be provided a separate feeder plate 8 in respect of each material discharge opening 7 and operating crossways of and through the hopper 1 each plate 8 being constructed the same as before and working through fittings as before described, the cross plates 8 being reciprocated through racks and oscillator pinions keyed on a rocking shaft actuated through an arm and a crank pin from a pinion driven by the spur wheel 42.

Having now fully described and ascertained my said invention and the manner in which it is to be performed I declare that what I claim is:—

1. In a manure distributor a feeder plate with recesses in its edges reciprocable through slotted fittings secured over material discharge openings in a hopper and means actuated from a running wheel of the distributor for operating said plate including a shifting link motion through which the stroke of said plate is variable substantially as described and illustrated.

2. In a manure distributor a feeder plate and means for operating same as in claim 1, and wherein the fittings through which said plate is reciprocable each comprise upper and lower castings, the lower of which contains an opening adapted to register with a material discharge opening and recesses in which the feeder plate works, substantially as described and illustrated.

3. In a manure distributor a hopper having material discharge openings, a feeder plate reciprocable over said openings in the hopper, means for operating said plate including a shifting link motion through which the stroke of said plate is variable, said feeder plate having a rack on one end meshing with an oscillator pinion or a rocking shaft, and an arm on the latter connected with a rod reciprocable through gearing from a running wheel of the distributor, substantially as described and illustrated.

4. In a manure distributor a feeder plate reciprocable over material discharge openings in a hopper: a rack on said plate; an oscillator pinion meshing with said rack; an agitator bar reciprocable in said hopper above said feeder plate: and a rack on said bar meshing with said pinion, substantially as described and illustrated.

5. A manure distributor comprising a hopper having in its bottom spaced material discharge openings, fittings having openings therein registering with said discharge opening, said fittings being secured to the sides of said hopper and being provided with slots, a feeder plate located in said slots, a rack upon one end of said feeder plate, a pinion cooperating with said rack and means for oscillating said pinion to reciprocate said feeder plate.

6. A manure distributor comprising a hopper having in its bottom spaced material discharge openings, fittings having openings therein, registering with said discharge opening, said fittings being secured to the sides of said hopper and being provided with slots, a feeder plate located in said slots, a rack upon one end of said feeder plate, a pinion cooperating with said rack, means for oscillating said pinion operated by movement of said distributor over the ground and means for varying the oscillations of said pinion.

7. A manure distributor comprising a hopper having in its bottom spaced material discharge openings, fittings having openings therein registering with said discharge opening, said fittings being secured to the sides of said hopper and being provided with slots, a feeder plate located in said slots, a rack upon one end of said feeder plate, a pinion cooperating with said rack, means for oscillating said pinion operated by movement of said distributor over the ground and manual means for varying the oscillations of said pinion.

In testimony whereof I have signed my name to this specification.

MICHAEL HIGGINS.